United States Patent [19]

Ford et al.

[11] Patent Number: 5,491,199
[45] Date of Patent: * Feb. 13, 1996

[54] ONE STEP PRODUCTION OF LOW SALT VINYLAMINE POLYMERS

[75] Inventors: Michael E. Ford, Coopersburg; John N. Armor, Orefield, both of Pa.

[73] Assignee: Air Products and Chemicals, Inc., Allentown, Pa.

[ * ] Notice: The portion of the term of this patent subsequent to Jul. 25, 2012, has been disclaimed.

[21] Appl. No.: 392,431

[22] Filed: Feb. 22, 1995

[51] Int. Cl.⁶ .................................................... C08F 8/12
[52] U.S. Cl. ........................ 525/362; 525/328.2; 525/371
[58] Field of Search ...................................... 525/362, 371

[56] References Cited

U.S. PATENT DOCUMENTS

| | | | |
|---|---|---|---|
| 4,393,174 | 7/1983 | Dawson et al. | 525/369 |
| 4,421,602 | 12/1983 | Brunnmueller et al. | 162/168.2 |
| 4,774,285 | 9/1988 | Pfohl et al. | 525/60 |
| 4,808,683 | 2/1989 | Itagaki et al. | 526/307.2 |
| 4,921,621 | 5/1990 | Costello et al. | 252/8.513 |
| 4,943,676 | 7/1990 | Pinschmidt, et al. | 525/383 |
| 4,957,977 | 9/1990 | Itagaki et al. | 525/328.4 |
| 5,037,927 | 8/1991 | Itagaki et al. | 526/307.7 |
| 5,064,909 | 11/1991 | Itagaki et al. | 525/340 |
| 5,281,340 | 1/1994 | Sato et al. | 210/734 |

FOREIGN PATENT DOCUMENTS 61-118406  6/1961  Japan .

OTHER PUBLICATIONS

Colquhoun, H. M. et al., *Carbonylation*, Plenum Press: New York, N.Y. 1991. pp. 207–225.

*Primary Examiner*—Bernard Lipman
*Attorney, Agent, or Firm*—Mark L. Rodgers; William F. Marsh

[57] ABSTRACT

Salt-free poly(vinylamine) and vinylamine copolymers are formed by heating N-vinylformamide or N-vinylformamide copolymers to a temperature from about 50° to 225° C. in an aqueous medium in the presence of a catalyst comprising a transition metal which is a member of either the first transition series or of Group VIII.

11 Claims, No Drawings

ONE STEP PRODUCTION OF LOW SALT VINYLAMINE POLYMERS

TECHNICAL FIELD OF THE INVENTION

The present invention relates to the conversion of poly(vinylformamide) and vinylformamide copolymers to poly(vinylamine) or the corresponding vinylamine copolymer.

BACKGROUND OF THE INVENTION

Owing to the tautomeric instability of vinylamine, poly(vinylamine) (pVA) and vinylamine copolymers are made indirectly by (co)polymerization of a derivative of vinylamine, such as N-vinylformamide, and subsequent removal of the derivatizing group. Previous methods for conversion of poly(N-vinylformamide) (pNVF) or analogous polymeric intermediates to pVA entail hydrolysis with either strong base (U.S. Pat. No. 4,393,174) or acid (U.S. Pat. No. 4,808,683). Japan Kokai Tokkyo Koho, Jp 61 118406 (1984) discloses the preparation of pVA by treatment of pNVF with a mixture of aqueous ammonia or alkylamine at room temperature, followed by hydrolysis with aqueous sodium or potassium hydroxide.

U.S. Pat. No. 4,421,602 discloses the production of copoly(N-vinylformamidevinylamine) by reaction of pNVF with acid or base. Aqueous sodium or potassium hydroxides are preferred and the use of ammonia or amines is disclosed, but not exemplified. In the latter instance, removal of formamide groups as the corresponding monomeric formamides is indicated. In each case, inorganic coproducts are formed in conjunction with pVA; base hydrolysis leads to alkali metal salts of the derivatizing group (eg, sodium or potassium formate), while acid hydrolysis gives the corresponding salt of pVA and formic acid. Neutralization provides pVA, accompanied by a salt of the acid used for hydrolysis and (unless formic acid was removed) a formate salt. Although some applications of pVA are insensitive to the presence of inorganics, many, including those in adhesives and coatings, require essentially salt-free pVA. Separation of these coproducts from pVA has been accomplished by traditional routes such as precipitation, selective extraction, or ultrafiltration. In all instances, however, preparation of salt-free pVA entails tedious removal and disposal of stoichiometric quantities of an inorganic coproduct.

Similar hydrolytic procedures have also been used to generate amine functional copolymers from the corresponding NVF copolymers. However, partial conversion of any additional hydrolytically labile functionality in the copolymer is often observed. Thus, hydrolysis of copolymers of NVF with (meth)acrylamides (U.S. Pat. No. 4,808,683), (meth)acrylonitrile (U.S. Pat. Nos. 4,957,977 and 5,064,909), or (meth)acrylates (U.S. Pat. No. 5,037,927) under acidic conditions yields amine functional polymers which also contain carboxylate groups. U.S. Pat. No. 4,921,621 reports comparable results with basic hydrolyses of NVF-acrylamide copolymers. U.S. Pat. No. 5,281,340 discloses amidine-containing polymers which are the products of acidic hydrolysis of NVF-(meth)acrylamide copolymers. U.S. Pat. No. 4,774,285 discloses water soluble polymers which are obtained by hydrolysis of copolymers of NVF with a variety of comonomers, eg, vinyl esters, N-vinylpyrrolidinone, (meth)acrylates, under strongly acidic or basic conditions. Copolymerized vinyl esters are also hydrolyzed, especially under basic conditions.

U.S. Pat. No. 4,943,676 discloses the thermolysis of pNVF as a route to pVA. High temperatures (>200° C.) are required, conversions to pVA are low to moderate, and difficultly soluble, crosslinked products are obtained. While the last disadvantage may be overcome by inclusion of water, the resulting products still contain formate salts.

H. M. Colquhoun, et al, "Carbonylation", Plenum Press, New York, 1991, pp 207– 225 report transition metal-mediated decarbonylations, especially of aromatic substrates. Aromatic aldehydes are decarbonylated catalytically by treatment with Pd/C at high temperature (the boiling point of the aldehyde, typically >200° C.). Poor selectivities are often obtained, owing to functional group sensitivity under the reaction conditions. Stoichiometric decarbonylations of aromatic aldehydes have been done with "Wilkinson's catalyst" [chlorotris(triphenylphosphine)rhodium] under mild conditions; however, the starting rhodium complex must be regenerated in a separate step. Cationic rhodium complexes of bridging diphosphines may be used for catalytic decarbonylation of aromatic aldehydes. The latter catalysts are extremely sensitive, and are active only under rigorously anhydrous and anaerobic conditions. Attempted extension of both stoichiometric and catalytic decarbonylations to aliphatic aldehydes is further complicated by multiple reaction pathways and extensive byproduct formation via β-elimination and/or isomerization of organometallic intermediates. Attempted decarbonylations of carboxylic acid derivatives have met with less success. Treatment of aroyl chlorides with stoichiometric quantities of "Wilkinson's catalyst" yields arylrhodium complexes; (chloro)arenes are not formed at temperatures <200° C. Catalytic decarbonylation of aroyl halides has been accomplished with this complex under forcing conditions (200°–300° C.); selectivity to desired products may again be an issue. Poor selectivity is encountered with aliphatic acid chlorides as the result of β-elimination and/or isomerization. Consequently, although catalytic carbonylation of monomeric amines to produce formamides and/or ureas has been demonstrated, the reverse process is virtually unknown.

Palladium(II) chloride-catalyzed decarbonylation of monomeric formamides is mentioned qualitatively and very briefly in a monograph "Organic Synthesis via Metal Carbonyls" ed. I. Wender and P. Pino, Wiley-Interscience, New York, Vol. 2, 1977, p. 630; however, no further detail has appeared in the literature. S. Kotachi, et al, Catal. Lett., 19, 339–334 (1933) observed decarbonylation of formanilide as a competing pathway in the production of carbamates from alcohols and formanilide with homogeneous ruthenium catalysts. Catalytic decarbonylation of pNVF or NVF copolymers, however, has not been reported in either the journal or patent literature.

SUMMARY OF THE INVENTION

The present invention provides a process for converting poly(N-vinylformamide) (pNVF), or an N-vinylformamide copolymer, to poly(vinylamine) or the corresponding vinylamine copolymer. The conversion is carried out by heating pNVF, or an NVF containing copolymer, in an aqueous solution to a temperature from about 50° to 225° C. in the presence of a catalyst comprising a transition metal which is a member of either the first transition series or of Group VIII. Within this class, the catalyst can comprise any metal or metal complex, including oxidized metals. The reaction mixture is subsequently cooled and vented to yield the corresponding vinylamine containing polymer.

The present process is advantageous over prior art methods in that it is a one-step process which provides for essentially salt-free hydrolysis, thereby eliminating the need for removal of coproduct salts.

DETAILED DESCRIPTION OF THE INVENTION

A process is provided for making essentially salt-free poly(vinylamine) or vinylamine copolymers from poly(N-vinylformamide) or NVF copolymers. In accordance with this process, pNVF or an NVF copolymer is heated in an aqueous solvent medium in the presence of a catalyst comprising a transition metal which is a member of either the first transition series or of Group VIII. Within this class, the catalyst can comprise any metal or metal complex, including oxidized metals. Catalysts which comprise members of Group VIII are preferred, with those containing palladium, platinum or rhodium being most preferred. As used herein, the term "Group VIII metal" refers to the current CAS version of the Periodic Table of the elements; i.e., to the group composed of iron, nickel, cobalt, ruthenium, rhodium, palladium, osmium, iridium and platinum. Metals in the first transition series include vanadium, chromium, manganese, copper, and zinc. The reaction is allowed to proceed for about 0.25 to 12 hours after which the reaction mixture is cooled and vented to yield the corresponding vinylamine homo- or copolymer.

In addition to poly(N-vinylformamide), the present process is also suitable for treatment of a wide variety of N-vinylformamide copolymers. Examples of suitable NVF copolymers include: copoly(N-vinylpyrrolidinone-NVF), copoly(acrylamide-NVF), copoly(vinyl acetate-NVF), copoly(vinyl alcohol-NVF), and the like. The concentration of NVF in the copolymer should be at least 1 mole %. Additionally, the copolymers may be block, alternating or random. Copolymers which only contain amides other than NVF do not work well in this process. In the case of either poly(N-vinylformamide) or NVF copolymers, molecular weight is not critical and can range from low, i.e. about 40,000 to very high, i.e. 900,000 or greater.

The pNVF or NVF copolymer is heated in an aqueous medium to a temperature from about 50° to 225° C. in the presence of a transition metal catalyst. The aqueous medium should be at least about 50 mole % water, although other solvents, such as alcohols, may also be present. Regardless of whatever other solvents are present along with water, it is important that the starting polymer be at least partially soluble in the solvent medium.

Typically, the catalyst should be present in a concentration of from about 5 to 70 mole % based upon the concentration of the starting polymer. Optionally, the Group VIII or first series transition metal may be present on a support such as carbon, calcium carbonate, barium sulfate, silica, alumina, silica/alumina, titania, magnesia, silica/titania, titania/alumina and the like. The supported catalyst may be used as a powder, or formed into pellets, extrudates, or monoliths.

The reaction may be carried out as either a batch or a continuous process. In the case of a batch process, the reaction is typically carried out for between 0.25 to 12 hours with from about 1 to 3 hours being preferred. The reactor is subsequently vented and cooled to yield the vinylamine polymer. Optionally, the effluent gas may be recovered or treated prior to venting. Essentially complete formate decomposition may be obtained by venting the reactor and then maintaining it at 70°–80° C. for 0.5 to 2.0 hr with a nitrogen purge to remove coproduct hydrogen and carbon dioxide.

In contrast to the prior art, the present process converts NVF polymers to the corresponding salt-free vinylamine polymers in a single step without the need for removal of coproduct salts.

The following examples were carried out to better illustrate the present invention and are not meant to be limiting.

EXPERIMENTAL

Preparations of pVA and pVA copolymers were carried out using the following general procedure. Dry, powdered pNVF or NVF containing copolymer of desired molecular weight was added to a 100 mL stainless steel Parr reactor, dissolved in deionized water, and a transition metal catalyst was added. The reactor was then sealed and pressure checked with nitrogen at 500–600 psig. Stirring was started and the mixture was heated to a predetermined temperature for a desired period of time. The reactor was subsequently cooled to room temperature and vented to release hydrogen and carbon dioxide to produce the hydrolysis product. Product samples were analyzed by $^1$H and $^{13}$C NMR after sparging with nitrogen. Typically, as can be seen from the examples below, pVA or pVA copolymer containing minor amounts of formate was the predominant product, with lesser concentrations of unchanged pendant formamide and intermediate amidine functionality.

EXAMPLES 1–19

Runs were carried out using the general experimental procedure set out above to produce poly(vinylamine) from a poly(vinylformamide) feedstock using a supported catalyst selected from palladium, ruthenium and rhodium. Example 5 was carried out without catalyst for comparative purposes. Specific reaction conditions as well as the results of these runs are set out in Table 1 below.

TABLE 1

| | | | | | | | | | | | |
|---|---|---|---|---|---|---|---|---|---|---|---|
| Production of Low Salt Poly(vinylamine) with Supported Palladium, Ruthenium, and Rhodium Catalysts | | | | | | | | | | | |
| | pNVF | MW | Catalyst | | | | | Selectivity[e] | | | Formate |
| Example | (gm)[a] | (× 10³) | (wt %)[b] | T (°C.) | t (hr) | Psig[c] | Conv (%)[d] | pNVF | pVA | Amidine | Dec (%)[f] |
| 1 | 3.76 | 53 | 5%Pd/C (1) | 180 | 2 | 360 | 79 | 13 | 71 | 16 | 79 |
| 2 | 3.75 | 53 | 5%Ru/C (1) | 180 | 2 | 320 | 67 | 17 | 51 | 32 | 62 |
| 3 | 3.75 | 53 | 5%Pd/C (1) | 165 | 3 | 220 | 64 | 19 | 48 | 33 | 62 |
| 4 | 3.75 | 53 | 5%Pd/C (1) | 165 | 6 | 295 | 66 | 21 | 54 | 25 | 78 |
| 5 | 3.75 | 53 | — | 180 | 2 | 190 | 38 | 28 | 5 | 67 | 0 |
| 6 | 3.75 | 1.3 | 5%Pd/C (1) | 165 | 3 | 180 | 67 | 21 | 56 | 23 | 61 |
| 7 | 3.75 | 1.3 | 5%Pd/C (1) | 165 | 6 | 240 | 81 | 6 | 67 | 27 | 65 |

TABLE 1-continued

Production of Low Salt Poly(vinylamine) with Supported Palladium, Ruthenium, and Rhodium Catalysts

| Example | pNVF (gm)[a] | MW (× 10³) | Catalyst (wt %)[b] | T (°C.) | t (hr) | Psig[c] | Conv (%)[d] | Selectivity[e] pNVF | pVA | Amidine | Formate Dec (%)[f] |
|---|---|---|---|---|---|---|---|---|---|---|---|
| 8  | 3.75  | 1.3 | 5%Pd/C (1)                  | 180 | 2 | 290 | 73 | 15 | 62 | 23 | 72 |
| 9  | 20.01 | 1.3 | 5%Pd/C (1)                  | 165 | 6 | 370 | 70 | 13 | 54 | 33 | 26 |
| 10 | 20.00 | 1.3 | 5%Pd/C (3)                  | 165 | 6 | 480 | 70 | 11 | 52 | 37 | 45 |
| 11 | 3.75  | 409 | 5%Pd/C (1)                  | 165 | 6 | 280 | 72 | 18 | 63 | 19 | 88 |
| 12 | 3.75  | 409 | 5%Pd/C (1)                  | 180 | 2 | 310 | 71 | 18 | 61 | 21 | 84 |
| 13 | 3.76  | 900 | 5%Pd/C (1)                  | 165 | 6 | 270 | 68 | 23 | 59 | 18 | 83 |
| 14 | 3.75  | 53  | 5%Pd/Al$_2$O$_3$ (1)        | 180 | 2 | 260 | 65 | 23 | 53 | 24 | 68 |
| 15 | 3.75  | 53  | 5%Pd/CaCO$_3$ (1)           | 180 | 2 | 260 | 64 | 23 | 51 | 26 | 62 |
| 16 | 3.75  | 53  | 5%Pt/C (1)                  | 180 | 2 | 300 | 73 | 14 | 61 | 25 | 74 |
| 17 | 3.75  | 53  | 5%Rh/C (1)                  | 180 | 2 | 200 | 60 | 18 | 39 | 43 | 51 |
| 18 | 3.75  | 53  | 5%Pd/C (1)                  | 200 | 2 |     | g  |    |    |    |    |
| 19 | 3.75  | 53  | 5%Ru/C (1)                  | 200 | 2 |     | g  |    |    |    |    |

[a]All reactions except Examples 10 and 11 were carried out in 50 mL deionized water; 40 mL deionized water was used in the latter.
[b]Wt % catalyst (dry basis), based on volume of reaction. expressed as [gm catalyst (dry basis)/mL reactant] × 100.
[c]Autogeneous pressure attained during reaction.
[d]Mole % of formamide groups reacted; balance remains either as pendant formamide or incorporated in cyclic amidine.
[e]Mole % of each functionality in isolated terpolymer.
[f]Mole % formate decomposed. In all instances, evolution of carbon dioxide was essentially quantitative (≧98%).
[g]Degradation of polymer backbone evident by $^{13}$C NMR.

EXAMPLES 20–32

Runs were carried out using the general experimental procedure set out above to produce poly(vinylamine) from a poly(vinylformamide) feedstock using base metal catalysts. Example 20 was carried out without catalyst for comparative purposes. Specific reaction conditions as well as the results for the runs are set out in Table 2 below.

EXAMPLES 33–46

Runs were carried out using the general experimental procedure set out above to produce copoly(vinyl alcohol-vinylamine) from the corresponding unhydrolyzed copolymer feedstock. Specific reaction conditions as well as the results of the runs are set out in Table 3 below.

TABLE 2

Production of Low Salt Poly(vinylamine) with Base Metal Catalysts

| Example | pNVF (gm)[a] | MW (× 10³) | Catalyst (wt %)[b] | T (°C.) | t (hr) | Psig[c] | Conv (%)[d] | Selectivity[e] pNVF | pVA | Amidine | Formate Dec (%)[f] |
|---|---|---|---|---|---|---|---|---|---|---|---|
| 20 | 3.75 | 53 | —                                    | 180 | 2 | 190 | 38 | 28 | 5  | 67 | 0  |
| 21 | 3.75 | 53 | 8%Co/Al$_2$O$_3$ (1)                 | 180 | 2 | 150 | 41 | 37 | 20 | 43 | 32 |
| 22 | 3.75 | 53 | 10%Ni/Al$_2$O$_3$ (1)                | 180 | 2 | 160 | 50 | 28 | 28 | 44 | 24 |
| 23 | 3.75 | 53 | 5%CoO—5%CuO/Al$_2$O$_3$ (1)[g]       | 180 | 2 | 170 | 34 | 38 | 6  | 56 | 0  |
| 24 | 3.75 | 53 | 68%Ni/support (1)[h]                 | 180 | 2 | 220 | 60 | 22 | 43 | 35 | 48 |
| 25 | 3.75 | 53 | 68%Ni/support (1)[h]                 | 165 | 6 | 190 | 64 | 14 | 43 | 43 | 43 |
| 26 | 3.75 | 53 | 40%Ni/Al$_2$O$_3$ (1)[i]             | 180 | 2 | 170 | 42 | 31 | 15 | 54 | 18 |
| 27 | 3.76 | 53 | 12%Cr$_2$O$_3$/Al$_2$O$_3$ (1)[j]    | 165 | 6 | 110 | 48 | 28 | 25 | 47 | 31 |
| 28 | 3.75 | 53 | 74%ZnO—22%Cr$_2$O$_3$ (1)[k]         | 180 | 2 | 170 | 54 | 20 | 29 | 51 | 25 |
| 29 | 3.75 | 53 | 74%ZnO—22%Cr$_2$O$_3$ (1)[k]         | 165 | 6 | 140 | 54 | 21 | 30 | 49 | 19 |
| 30 | 3.75 | 53 | 20%Fe$_2$O$_3$/Al$_2$O$_3$ (1)[l]    | 180 | 2 | 175 | 49 | 24 | 22 | 54 | 20 |
| 31 | 3.75 | 53 | 20%Fe$_2$O$_3$/Al$_2$O$_3$ (1)[l]    | 165 | 6 | 130 | 44 | 24 | 15 | 61 | 19 |
| 32 | 3.75 | 53 | 51%CuO/49%Cr$_2$O$_3$ (1)[m]         | 180 | 2 | 155 | 34 | 34 | 20 | 64 | 17 |

[a]All reactions carried out in 50 mL deionized water.
[b]Wt % catalyst (dry basis), based on volume of reaction. expressed as [gm catalyst (dry basis)/mL reactant] × 100.
[c]Autogeneous pressure attained during reaction.
[d]Mole % of formamide groups reacted; balance remains either as pendant formamide or incorporated in cyclic amidine.
[e]Mole % of each functionality in isolated terpolymer.
[f]Mole % formate decomposed. In all instances, evolution of carbon dioxide was essentially quantitative (≧98%).
[g]Harshaw Cu0901.
[h]Harshaw Ni1404T.
[i]HSC102B.
[j]Harshaw Cr0103.
[k]Harshaw Zn00312.
[l]Harshaw Fe0301.
[m]Harshaw Cu1808T.

TABLE 3

Production of Low Salt Copoly(vinyl alcohol - vinylamine)

| Example[a] | Copolymer (gm; wt % NVF)[b] | Catalyst (wt %)[c] | T (°C.) | t (hr) | Conv (%)[d] | Selectivity[e] pNVF | pVA | Amidine | Formate Dec (%)[f] |
|---|---|---|---|---|---|---|---|---|---|
| 33 | 8 (6)  | 5%Pd/C (1) | 150 | 3 | >99 | [g] | >99 | [g] | >99 |
| 34 | 3 (6)  | 5%Pd/C (1) | 180 | 2 | >99 | [g] | >99 | [g] | >99 |
| 35 | 3 (6)  | 5%Pd/C (1) | 150 | 6 | >99 | [g] | >99 | [g] | >99 |
| 36 | 3 (6)  | 5%Pd/C (2) | 165 | 3 | >99 | [g] | >99 | [g] | >99 |
| 37 | 3 (6)  | 5%Pd/C (2) | 150 | 3 | >99 | [g] | >99 | [g] | >99 |
| 38 | 3 (6)  | 5%Pd/C (2) | 125 | 6 | >99 | [g] | >99 | [g] | >99 |
| 39 | 3 (6)  | 5%Pd/C (1) | 100 | 6 | 22  | 78  | 22  | [g] | 77 |
| 40 | 8 (12) | 5%Pd/C (1) | 150 | 3 | 83  | 17  | 83  | [g] | 50 |
| 41 | 8 (12) | 5%Pd/C (1) | 150 | 6 | 88  | [g] | 77  | 23  | 44 |
| 42 | 8 (12) | 5%Pd/C (3) | 150 | 6 | 90  | 6   | 87  | 7   | 79 |
| 43 | 8 (12) | 5%Pd/C (1) | 165 | 3 | 86  | 8   | 79  | 13  | 51 |
| 44 | 8 (12) | 5%Pd/C (2) | 125 | 6 | 51  | 49  | 51  | [g] | 48 |
| 45 | 3 (12) | 5%Pd/C (3) | 100 | 6 | 42  | 58  | 42  | [g] | >99 |
| 46 | 3 (12) | 5%Pd/C (1) | 100 | 6 | 6   | 89  | ≦2  | 9   | [g] |

[a]All reactions carried out in 50 mL deionized water.
[b]Amount of copoly(vinyl alcohol - N-vinylformamide) with indicated wt % of copolymerized NVF used in each run.
[c]Wt % catalyst (dry basis), based on volume of reaction. expressed as [gm catalyst (dry basis)/mL reactant] × 100.
[d]Mole % of formamide groups reacted; balance remains either as pendant formamide or incorporated in cyclic amidine.
[e]Mole % of each functionality in isolated terpolymer; copolymerized vinyl alcohol was unchanged.
[f]Mole % formate decomposed. In all instances, evolution of carbon dioxide was essentially quantitative (≧96%).
[g]Not detected.

Runs 33–46 demonstrate that essentially quantitative conversions, selectivity to poly(vinylamine), and formate decompositions can be obtained with copoly(vinyl alcohol— 6% NVF) under a variety of conditions. Even at the relatively low temperature of 100° C. (Example 39), some conversion and good formate decomposition were found. Somewhat lower conversions and formate decompositions were obtained with copoly(vinyl alcohol—12% NVF) under similar conditions (runs 40–46). With the latter copolymer, best conversions were found with higher catalyst loadings (compare Examples 41 and 42, 45 and 46).

EXAMPLES 47–48

Runs were carried out using the general experimental procedure set out above to produce copoly(N-vinylpyrrolidinone-vinylamine) from the corresponding unhydrolyzed copolymer feedstock. Reaction conditions and results are set out in Table 4 below.

impurities. Moderate conversions and good to excellent formate decompositions are obtained.

EXAMPLES 49–51

Runs were carried out using the general experimental procedure set out above to produce copoly(acrylamide-vinylamine) from the corresponding unhydrolyzed copolymer feedstock. Reaction conditions and results are set out in Table 5 below.

TABLE 4

Production of Low Salt Copoly(N-vinylpyrrolidinone - vinylamine)

| Example | Copolymer (gm; wt % NVF)[b] | Catalyst (wt %)[c] | T (°C.) | t (hr) | Conv (%)[d] | Selectivity[e] pNVF | pVA | Amidine | Formate Dec (%)[f] |
|---|---|---|---|---|---|---|---|---|---|
| 47 | 7.8 (40) | 5%Pd/C (1) | 150 | 6 | 43 | 57 | 43 | [g] | 91 |
| 48 | 7.8 (40) | 5%Pd/C (1) | 180 | 2 | 48 | 52 | 48 | [g] | 85 |

[a]All reactions carried out in 50 mL deionized water.
[b]Amount of copoly(N-vinylpyrrolidinone - N-vinylformamide) with indicated wt % of copolymerized NVF used in each run.
[c]Wt % catalyst (dry basis), based on volume of reaction. expressed as [gm catalyst (dry basis)/mL reactant] × 100.
[d]Mole % of formamide groups reacted; balance remains either as pendant formamide or incorporated in cyclic amidine.
[e]Mole % of each functionality in isolated terpolymer.
[f]Mole % formate decomposed. In all instances, evolution of carbon dioxide was essentially quantitative (≧98%).
[g]Not detected.

Runs 33 and 34 demonstrate one step conversion of copoly(N-vinylpyrrolidinone-N-vinylformamide) to copoly(N-vinylpyrrolidinone-N-vinylformamide-vinylamine) which contains a low concentration of inorganic

TABLE 5

Production of Low Salt Copoly(acrylamide - vinylamine)[a]

| Example | Copolymer (gm; wt % NVF)[b] | Catalyst (wt %)[c] | T (°C.) | t (hr) | Conv (%)[d] | Selectivity[e] pNVF | pVA | Amidine | Lactam | Formate Dec (%)[f] |
|---|---|---|---|---|---|---|---|---|---|---|
| 49 | 2.85 (45) | 5%Pd/C (2.5) | 125 | 4 | 26 | 74 | 11 | [g] | 15 | >99 |
| 50 | 2.85 (45)[h] | 5%Pd/C (1.25) | 100 | 3 | 29 | 71 | 9 | [g] | 20 | >99[i] |
| 51 | 2.85 (45)[h] | 5%Pd/C (2.5) | 100 | 2 | 46 | 54 | 31 | [g] | 15 | 62[i] |

[a]All reactions carried out in 40 mL deionized water.
[b]Amount of copoly(acrylamide - N-vinylformamide) with indicated wt % of copolymerized NVF used in each run.
[c]Wt % catalyst (dry basis), based on volume of reaction. expressed as [gm catalyst (dry basis)/mL reactant] × 100.
[d]Mole % of formamide groups reacted; balance remains either as pendant formamide or incorporated in cyclic amidine.
[e]Mole % of each functionality in isolated terpolymer.
[f]Mole % formate decomposed. In all instances, evolution of carbon dioxide was essentially quantitative (≧98%).
[g]Not detected.
[h]Formic acid (2.14 gm of 89 wt % solution) added.
[i]Mole % formate and formic acid decomposed.

Examples 49–51 demonstrate that amine functional acrylamide copolymers can be made via this route. However, even under acidic conditions (Examples 50, 51), significant amounts of the cyclic lactam derived from adjacent carboxamide and amine groups was formed.

EXAMPLES 52–53

Runs were carried out to try to react aqueous poly(N-vinyl-N-methylacetamide) under the same reaction conditions and using the same catalyst as Examples 1 and 4 as set out in Table 1. No hydrolysis or acetate decomposition was observed for either run, indicating the importance of vinylformamide in the feedstock.

Having thus described the present invention, what is now deemed appropriate for Letters Patent is set out in the following appended claims.

We claim:

1. A process for the conversion of an N-vinylformamide containing polymer to the corresponding vinylamine polymer, said process comprising heating said N-vinylformamide containing polymer to a temperature of from about 50° to 225° C. in an aqueous medium in the presence of a catalyst comprising a transition metal selected from the group consisting of Group VIII metals, vanadium, chromium, manganese, copper, and zinc.

2. A process in accordance with claim 1 wherein said N-vinylformamide containing polymer is poly(N-vinylformamide).

3. A process in accordance with claim 1 wherein said N-vinylformamide containing polymer is copoly(N-vinylpyrrolidinone-N-vinylformamide).

4. A process in accordance with claim 1 wherein said catalyst comprises a Group VIII metal selected from the group consisting of palladium, rhodium and ruthenium.

5. A process in accordance with claim 1 wherein said catalyst comprises a Group VIII metal on a support.

6. A process in accordance with claim 5 wherein said catalyst support is selected from the group consisting of carbon, calcium carbonate, barium sulfate, silica, alumina, silica/alumina, titania, magnesia, silica/titania, and titania/alumina.

7. A process in accordance with claim 1 wherein said N-vinylformamide containing polymer contains N-vinylformamide units and units selected from the group consisting of vinyl alcohol, acrylamide and mixtures thereof.

8. A process in accordance with claim 1 which is carried out as a batch process.

9. A process in accordance with claim 8 which is carried out for a time from 0.25 to 12 hours.

10. A process in accordance with claim 1 which is carried out as a continuous process.

11. A process in accordance with claim 1 wherein said catalyst is present in the reaction mixture in a concentration of from 5 to 70 mole % based upon the concentration of the starting polymer.

* * * * *